W. R. ANDERSON.
BUSHING.
APPLICATION FILED JUNE 2, 1910.
993,745.
Patented May 30, 1911.
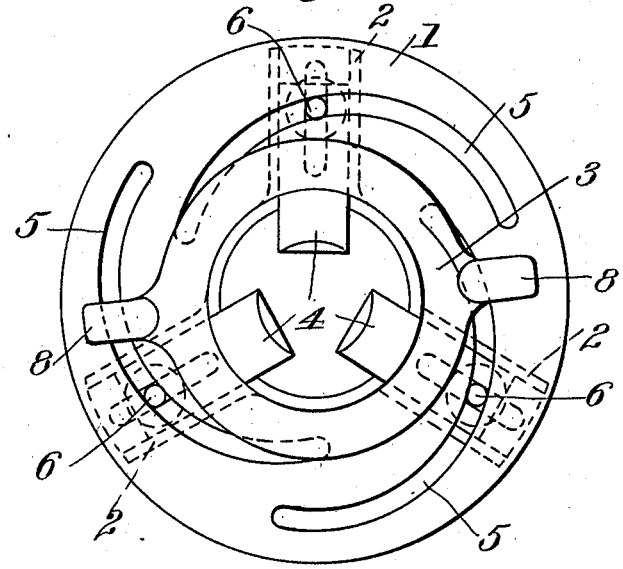
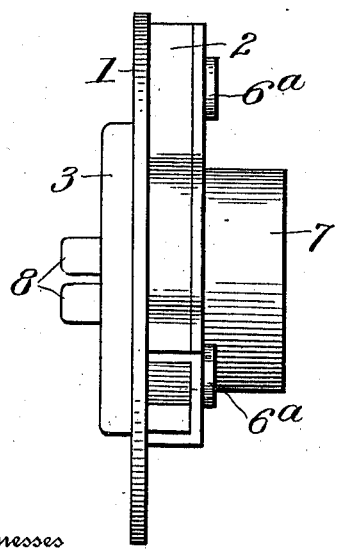
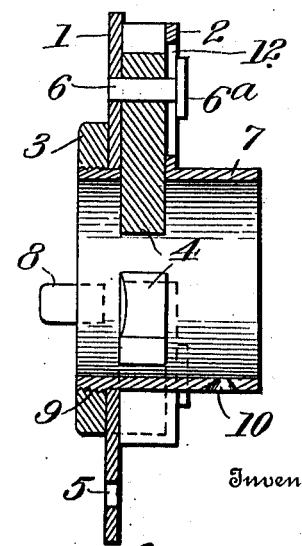
Witnesses
C. H. Walker.
Edith Smith
Inventor
William R. Anderson
By Bomhardt & Co.
Attorneys

UNITED STATES PATENT OFFICE.

WILLIAM R. ANDERSON, OF CLEVELAND, OHIO.

BUSHING.

993,745.   Specification of Letters Patent.   Patented May 30, 1911.

Application filed June 2, 1910. Serial No. 564,590.

*To all whom it may concern:*

Be it known that I, WILLIAM R. ANDERSON, a citizen of the United States, residing at Cleveland, in the county of Cuyahoga and State of Ohio, have invented certain new and useful Improvements in Bushings, of which the following is a specification.

This invention relates to bushings adapted for use in connection with threading die stocks for the purpose of centering and guiding the pipe or other work with respect to the die, and it is adapted to be applied to various known die stocks without the trouble and expense of providing and using a separate set of bushings according to the various sizes of work.

The invention provides a bushing which includes or comprises a set of jaw pieces which may be advanced or retracted to fit pipes of different sizes by means of an adjusting ring with curved slots which engage pins attached to the jaws for the purpose of moving said jaw pieces radially, and the device further comprises simple and convenient means for clamping said jaws in adjusted position.

By means of the device, straight threads may be cut on all sizes of pipes and bolts that the stock will take.

The invention is illustrated in the accompanying drawings in which—

Figure 1 is a plan view of the bushing. Fig. 2 is a side view. Fig. 3 is a central longitudinal section thereof.

Referring specifically to the drawings 7 indicates the bushing sleeve which is adapted to fit onto or over the collar of the die stock, where it may be fastened in any suitable manner, as by a screw in the hole 10. This sleeve has integral therewith a series of radial casings or ways 2 which serve as guides for the sliding jaws or clamping pieces 4 which work through openings in the sleeve or barrel 7 and are adapted to center a pipe or other piece of work located in said sleeve. The casings 2 have radial slots 12 for pins 6 which extend through said slots and also through the jaw pieces 4 in which the pins are tightly fitted. An annular plate 1 fits on the outer end of the sleeve and against the jaws 4, the ways or guides 2 being open on the side toward the ring so that said ring may be clamped against said jaws, and this ring or plate has a series of slots 5, spirally arranged and corresponding in position to the jaws 3, and the ends of the pins 6 project into these slots, and a cam closing or opening action of the jaws is effected when said ring is turned on the sleeve. The ring may be held at adjustment, and clamped against the jaws to fasten the same by means of a lock nut 3 which screws on the outer end of the sleeve, which is threaded as indicated at 9 for that purpose. The nut has wings 8 whereby it may be turned.

In the use of the device, the bushing being first placed on the collar of the stock and the work inserted, the ring is turned to advance the jaws by means of the inclined slots and connecting pins, and the jaws when fully advanced center the work in position, after which the clamping nut 3 is turned to hold the parts fast.

The ring 1 may be removed and reversed to make its action either right or left handed, and the ways 2 in which the jaws slide insure correct alinement and position of said jaws. By manipulation of the single nut 3 the plate can be readily tightened or loosened, making the bushing instantly available for adjustment according to the work at hand. The bushing can remain on the stock at all times, and by making the cam plate and jaws of steel the durability of the device is assured, and the pipe will always be centered perfectly.

The pins 6 are provided with flat heads 6ª, on the ends adjacent the slot 12, and these flat heads serve to keep the pins securely and in proper alinement in the slots 12.

Having thus described the invention, what I claim as new and desire to secure by Letters Patent is:—

A bushing for a die stock, comprising a sleeve having radial ways and guide slots in one side of said ways, a removable ring mounted to turn on the sleeve on the opposite side of said ways, and having cam slots, jaws slidable radially in the ways, pins projecting from the jaws into the guide slots at one end and into the cam slots at the opposite end, the ends of the pins in the guide slots having heads engaging the ways to hold the jaws in the ways when the ring is removed, and means to clamp the jaws as adjusted.

In testimony whereof, I do affix my signature in presence of two witnesses.

WILLIAM R. ANDERSON.

Witnesses:
STEDMAN J. ROCKWELL,
EVA M. BOWDEN.

Copies of this patent may be obtained for five cents each, by addressing the "Commissioner of Patents, Washington, D. C."